(12) United States Patent
Harris et al.

(10) Patent No.: US 7,440,450 B2
(45) Date of Patent: Oct. 21, 2008

(54) PAYLOAD MODULE HAVING A SWITCHED FABRIC ENABLED MEZZANINE CARD

(75) Inventors: Jeffrey M. Harris, Chandler, AZ (US);
Douglas L. Sandy, Chandler, AZ (US);
Robert C. Tufford, Chandler, AZ (US)

(73) Assignee: Emerson Network Power-Embedded Computing, Inc., Madison, WI (US)

( * ) Notice: Subject to any disclaimer, the term of this patent is extended or adjusted under 35 U.S.C. 154(b) by 936 days.

(21) Appl. No.: 10/947,740

(22) Filed: Sep. 23, 2004

(65) Prior Publication Data

US 2006/0062213 A1 Mar. 23, 2006

(51) Int. Cl.
*H04L 12/50* (2006.01)
*H04Q 11/00* (2006.01)

(52) U.S. Cl. .................. 370/387; 370/278; 370/352; 370/353; 370/354; 370/356; 370/388; 370/230; 370/231; 370/232; 370/235; 710/313; 710/312; 710/314; 710/316; 710/305; 361/796; 361/803; 361/788; 439/61; 439/62; 439/74

(58) Field of Classification Search ............. None
See application file for complete search history.

(56) References Cited

U.S. PATENT DOCUMENTS

| 6,041,375 | A | * | 3/2000 | Bass et al. ............... 710/302 |
| 6,098,133 | A | * | 8/2000 | Summers et al. ........... 710/107 |
| 6,286,072 | B1 | * | 9/2001 | Bredin et al. ............. 710/305 |
| 2002/0124114 | A1 | * | 9/2002 | Bottom et al. ............. 709/251 |
| 2002/0194412 | A1 | * | 12/2002 | Bottom ................... 710/302 |
| 2004/0078506 | A1 | * | 4/2004 | Wong et al. .............. 710/301 |

* cited by examiner

*Primary Examiner*—Raj K Jain
(74) *Attorney, Agent, or Firm*—Harness, Dickey & Pierce, P.L.C.; Joseph M. Lafata

(57) ABSTRACT

A multi-service platform system, includes a backplane (104), a switched fabric (106) on the backplane, and at least one of a VMEbus network and a PCI network coincident with the switched fabric on the backplane. A payload module (102) has one of a 3U form factor, a 6U form factor and a 9U form factor, where the payload module is communicatively coupled with the backplane using the switched fabric and at least one of the VMEbus network and the PCI network. At least one multi-gigabit connector (118) is coupled to a rear edge (119) of the payload module, where the at least one multi-gigabit connector is coupled to communicatively interface the payload module to the backplane, and where the switched fabric and at least one of the VMEbus network and the PCI network are communicatively coupled with the payload module through the at least one multi-gigabit connector.

23 Claims, 2 Drawing Sheets

PAYLOAD MODULE HAVING A SWITCHED FABRIC ENABLED MEZZANINE CARD

BACKGROUND OF THE INVENTION

Expansion cards can be added to computer systems to lend additional functionality or augment capabilities. Current expansion cards interface and communicate with computer systems using primarily a multi-drop parallel bus network architecture, such as Peripheral Component Interconnect (PCI) or VERSAmodule Eurocard (VMEbus). A multi-drop parallel bus architecture has the disadvantage that it can only be used to support one instantaneous communication between modules in a computer system or network. However, some applications have requirements for simultaneous high bandwidth transfers between modules that cannot be handled by the multi-drop parallel bus architecture.

In the prior art, expansion cards, particularly mezzanine cards, are placed on payload modules mounted in chassis-type computer systems, such as VMEbus type systems known in the art. The prior art method of interfacing the expansion cards requires the payload module to manage the mezzanine cards through use of a processor and bus onboard the payload module. This adds complexity and expense when adding additional functionality to the chassis-type computer system. Therefore, it is desirable to provide expansion cards in a chassis-type environment that support high-speed data transfers, while minimizing the complexity and expense of controlling the expansion cards from the payload module.

In the prior art, 6U form factor cards are common. The 3U form factor offers an advantage for applications where physical space is at a premium. The 9U form factor offers an advantage of placing more computing features on a given card. Prior art 3U and 9U form factor expansion cards interface with a backplane using parallel multi-drop networks. This has the disadvantage of being slow and cumbersome for network expansion.

Accordingly, there is a significant need for an apparatus and method that overcomes the deficiencies of the prior art outlined above.

BRIEF DESCRIPTION OF THE DRAWINGS

Referring to the drawing.

Figure 1:
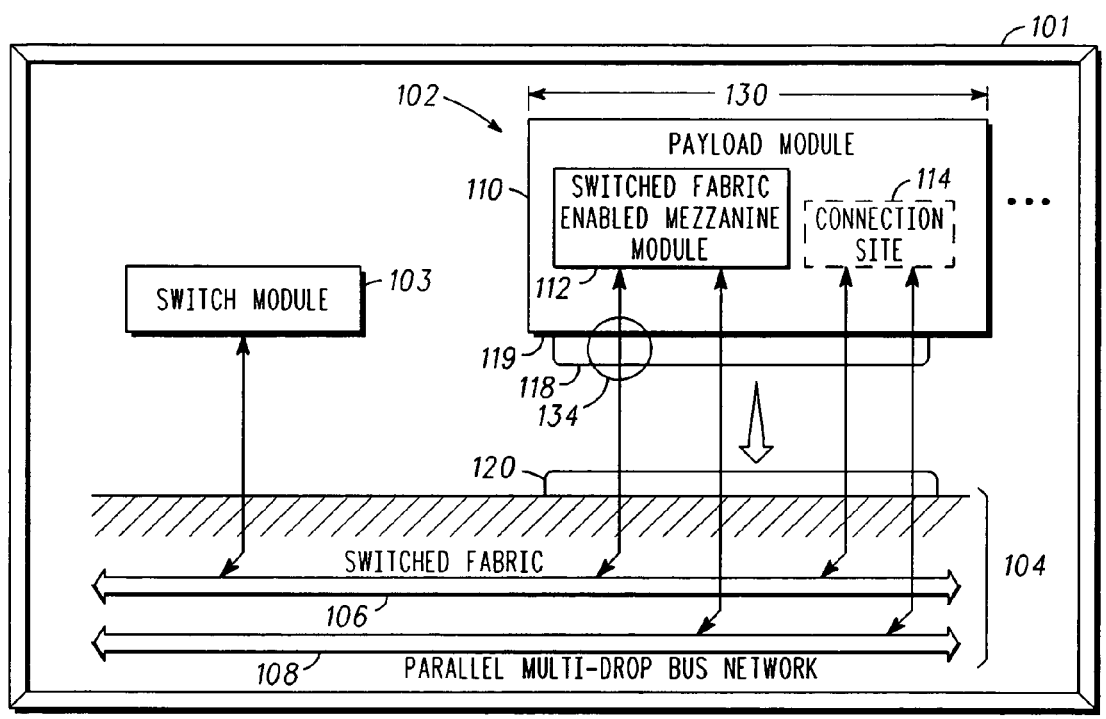
FIG. 1 depicts a multi-service platform system according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a multi-service platform system 100 according to one embodiment of the invention. Multi-service platform system 100 can include computer chassis 101, with software and any number of slots for inserting modules, which can be, for example and without limitation, a payload module 102, a switch module 103, and the like. Payload module 102 can add functionality to multi-service platform system 100 through the addition of processors, memory, storage devices, device interfaces, network interfaces, and the like. In an embodiment, multi-service platform system 100 can be an embedded, distributed processing computer system, where computer chassis 101 is an embedded computer chassis.

In an embodiment, multi-service platform system 100 can be controlled by a platform controller (not shown for clarity), which can include a processor for processing algorithms stored in memory. Memory comprises control algorithms, and can include, but is not limited to, random access memory (RAM), read only memory (ROM), flash memory, electrically erasable programmable ROM (EEPROM), and the like. Memory can contain stored instructions, tables, data, and the like, to be utilized by processor. Platform controller can be contained in one, or distributed among two or more payload modules with communication among the various modules of multi-service platform system 100.

Multi-service platform system 100 can include backplane 104 coupled for receiving payload module 102 and switch module 103. Backplane 104 can include hardware and software necessary to implement a coincident parallel multi-drop bus network 108 and a switched fabric 106. Backplane 104 can include switched fabric 106 and a parallel multi-drop bus network 108. In an embodiment, both switched fabric 106 and parallel multi-drop bus network 108 run concurrently on backplane 104.

In an embodiment, parallel multi-drop bus network 108 can be a VMEbus network. VMEbus network is defined in the ANSI/VITA 1-1994 and ANSI/VITA 1.1-1997 standards, promulgated by the VMEbus International Trade Association (VITA), P.O. Box 19658, Fountain Hills, Ariz., 85269 (where ANSI stands for American National Standards Institute). In an embodiment of the invention, VMEbus network can include VMEbus based protocols such as Single Cycle Transfer protocol (SCT), Block Transfer protocol (BLT), Multiplexed Block Transfer protocol (MBLT), Two Edge VMEbus protocol (2eVME) and Two Edge Source Synchronous Transfer protocol (2eSST). VMEbus network 108 is not limited to the use of these VMEbus based protocols and other VMEbus based protocols are within the scope of the invention.

In another embodiment, parallel multi-drop bus network 108 can be a Peripheral Component Interconnect (PCI) network. PCI network can include standard PCI or Peripheral Component Interconnect-X (PCI-X) based protocols. Examples of variants of PCI-X protocols, without limitation, include 133 MHz 64-bit PCI-X, 100 MHz 64-bit PCI-X down to 66 MHz 32-bit PCI-X, and the like. Examples of PCI based protocols (a subset of PCI-X based protocols), can include 66 MHz 64-bit PCI down to 33 MHz 32-bit PCI, and the like.

Switched fabric 106 can use switch module 103, particularly at least one central switching resource on switch module 103, as a hub. Switch module 103 can be coupled to any number of payload modules 102. Switched fabric 106 can be based on a point-to-point, switched input/output (I/O) fabric, whereby cascaded switch devices interconnect end node devices. Although FIG. 1 depicts switched fabric 106 as a bus for diagrammatic ease, switched fabric 106 may in fact be a star topology, mesh topology, and the like as known in the art for communicatively coupling modules. Switched fabric 106 can include both module-to-module (for example computer systems that support I/O module add-in slots) and chassis-to-chassis environments (for example interconnecting computers, external storage systems, external Local Area Network (LAN) and Wide Area Network (WAN) access devices in a data-center environment). Switched fabric 106 can be implemented by using one or more of a plurality of switched fabric network standards, for example and without limitation, InfiniBand™, Serial RapidIO™, FibreChannel™, Ethernet™, PCI Express™, Hypertransport™, and the like. Switched fabric 106 is not limited to the use of these switched fabric network standards and the use of any switched fabric network standard is within the scope of the invention.

In an embodiment of the invention, parallel multi-drop bus network 108 and switched fabric 106 operate concurrently within multi-service platform system 100. In an example of an embodiment, parallel multi-drop bus network 108 can operate as a control plane by synchronizing and organizing activities in multi-service platform system 100. Switched fabric 106 can operate as a data plane by transferring data between individual payload modules 102. In this embodiment, data is transferred faster through the higher bandwidth switched fabric 106, while the parallel multi-drop bus network 108 controls and manages the overall system. This has the effect of increasing the speed of multi-service platform system 100 since data transfers that are in excess of parallel multi-drop bus network 108 bandwidth can take place using switched fabric 106. In an embodiment, payload module 102 is communicatively coupled with backplane 104 using switched fabric 106 and at least one of VMEbus network or PCI network (parallel multi-drop bus network 108).

Multi-service platform system 100 can include any number of payload modules 102 and switch modules 103 coupled to backplane 104. Backplane 104 can include hardware and software necessary to implement a coincident parallel multi-drop bus network 108 and a switched fabric 106.

In an embodiment, payload module 102 can comprise a board 110, for example a printed wire board (PWB), and the like. In an embodiment, payload module 102 can have a form factor 130, which can refer to physical dimensions, electrical connections, and the like, of payload module 102. In an embodiment, payload module 102 can have one of a 3U form factor, 6U form factor or a 9U form factor.

As is known in the art, "U" and multiples of "U" can refer to the width of a module or expansion card. In an embodiment, "U" can measure approximately 1.75 inches. Payload module 102 can have its own specific set of electrical connections to interface with backplane 104 of computer chassis 101. As an example of an embodiment, multi-service platform system 100 can include computer chassis 101 and one or more payload modules 102, each having one of a 3U form factor, 6U form factor or a 9U form factor. In an embodiment, such payload modules 102 can conform to the VITA 46 standard as set forth by VMEbus International Trade Association (VITA), P.O. Box 19658, Fountain Hills, Ariz., 85269.

In an embodiment, switch module 103 can comprise a board, for example a PWB, and the like. Coupled to the board can be one or more central switching resources that can for example, function as a hub for switched fabric 106. In an embodiment, switch module 103 can include any combination of processor, memory, storage, communication devices and the like. Switch module 103 can add any type of computing, storage, communication features, and the like to multi-service platform system 100. Multi-service platform system can include any number of switch modules 103 coupled to operate any number of switched fabrics. For example, in an embodiment, multi-service platform system can include two switch modules, where switch fabric 106 comprises a first and second switch fabric. In this embodiment, each switch module is coupled to operate or act as a hub for each of the first and second switched fabric.

In an embodiment of the invention, backplane 104 and payload module 102 can have a set of interlocking, modular connectors designed to interlock with each other when payload module 102 is placed in a slot of multi-service platform system 100. In the embodiment shown, payload module 102 has at least one multi-gigabit connector 118 coupled to rear edge 119. In an embodiment, at least one multi-gigabit connector 118 can include printed circuit board (PCB) wafers (as opposed to metal pins), where wafers are held together in a plastic housing and can be coupled to the payload module 102 using press to fit contacts. For example, at least one multi-gigabit connector 118 can use PCB based pinless interconnect that uses printed circuit wafers instead of traditional pin and socket contacts.

In an embodiment, at least one multi-gigabit connector 118 can use at least one of single ended or differential pair 134 signal configuration in the same connector. Multi-gigabit connector 118 can transfer data in excess of three (3) gigabits per second per each differential pair 134. In an embodiment, differential pair 134 can be a bonded differential pair. At least one multi-gigabit connector 118 is coupled to communicatively interface payload module 102 with backplane 104, where switched fabric 106 and at least one of VMEbus network or PCI network are communicatively coupled to payload module 102 through at least one multi-gigabit connector 118.

In an embodiment, at least one multi-gigabit connector 118 is coupled to interface with at least one corresponding multi-gigabit connector 120 on backplane 104. At least one corresponding multi-gigabit connector 120 can be a female receptacle with metal beam spring leaf contacts which engage with the PCB wafers of multi-gigabit connector 118 when coupled together.

In an embodiment, at least one multi-gigabit connector 118 spans substantially the entire portion of the rear edge 119 of payload module 102. Rear edge 119 can include any number of multi-gigabit connectors 118 and be within the scope of the invention. In an embodiment, all communication between payload module 102 and backplane 104 occur exclusively through at least one multi-gigabit connector 118. In this embodiment, rear edge 119 of payload module 102 excludes a legacy connector, which can include traditional pin and socket connectors designed for low-speed data transfer. In other words, all data transfer and communication, whether to/from switched fabric 106 and at least one of VMEbus network or PCI network (parallel multi-drop bus network 108) occur through at least one multi-gigabit connector 118.

In an example of an embodiment of the invention, at least one multi-gigabit connector 118 and corresponding at least one multi-gigabit connector 120 can be a Tyco MultiGig RT connector manufactured by the AMP division of Tyco Electronics, Harrisburg, Pa. The invention is not limited to the use of the Tyco MultiGig RT connector, and any connector capable of throughput per differential pair of at least three gigabits per second is encompassed within the invention.

In an embodiment, payload module 102 can include any number of expansion modules, which can be for example, mezzanine cards. An exemplary mezzanine card can be a Common Mezzanine Card (CMC) having a CMC form factor. CMC form factor, including mechanical dimensions, electrical specifications, and the like, are known in the art and set forth in the Institute of Electrical and Electronics Engineers (IEEE) standard P1386.

A particular example of an embodiment is a switched fabric enabled mezzanine card (XMC) 112. As an example of an embodiment, XMC's are described in VITA 42 promulgated by VMEbus International Trade Association (VITA), P.O. Box 19658, Fountain Hills, Ariz., 85269. In an embodiment, switched fabric enabled mezzanine card 112 can be coupled to payload module 102 and communicatively couple switched fabric enabled mezzanine card 112 with backplane 104 and switched fabric 106. Payload module 102 can include any number of switched fabric enabled mezzanine cards 112. In an embodiment, payload module 102 can include up to two switched fabric enabled mezzanine cards.

In an embodiment, switched fabric enabled mezzanine card 112 is coupled to directly communicate with backplane 104 and hence switched fabric 106. In an embodiment, switched fabric enabled mezzanine card 112 can be coupled to directly communicate with switch module 103. Directly communicate can mean that although switched fabric enabled mezzanine card 112 is coupled to payload module 102, payload module 102 does not control or manage switched fabric enabled mezzanine card 112. In effect, payload module 102 can omit the use of any processors or buses to control or manage switched fabric enabled mezzanine card 112. In this embodiment, switch module 103 controls switched fabric enabled mezzanine card 112 without any input from payload module 102.

In an embodiment, switched fabric enabled mezzanine card 112 is coupled directly to backplane 104 and hence switched fabric 106. In this embodiment, payload module 102 acts as a carrier module for switched fabric enabled mezzanine card 112, with payload module acting merely as a connection point for switched fabric enabled mezzanine card 112 to physically interface with switched fabric 106. In this embodiment, payload module 102 does not have to appear as an active node on switched fabric 106. However, in another embodiment, payload module 102 can appear as an active node on either or both of parallel multi-drop bus network 108 and switched fabric 106.

In an embodiment, since switched fabric enabled mezzanine card 112 is coupled directly to switched fabric 106 and backplane 104, switched fabric enabled mezzanine card 112 is coupled to directly communicate with switch module 103. Hence, in this embodiment, switch module 103 can directly control switched fabric enabled mezzanine card 112. In effect, switched fabric enabled mezzanine card 112 is an independent node on switched fabric 106 that can operate on switched fabric 106 without guidance, management or interference from payload module 102.

In an embodiment, payload module 102 can include switched fabric enabled mezzanine card 112 that only interfaces with switched fabric 106. In another embodiment, payload module 102 can include switched fabric enabled mezzanine card 112 that interfaces and communicates with both switched fabric 106 and parallel multi-drop bus network 108. In another embodiment, payload module 102 can include a switched fabric enabled mezzanine card 112 that communicates only with switched fabric 106, and a mezzanine card (not shown for clarity) that only communicates with parallel multi-drop bus network 108. Payload module can include any combination of the above embodiments and be within the scope of the invention.

In an embodiment, payload module 102 can include switched fabric enabled mezzanine card connection site 114 for coupling switched fabric enabled mezzanine card 112 to payload module 102. Switched fabric enabled mezzanine card connection site 114 can be include any type of electrical or optical connector to interface switched fabric enabled mezzanine card 112 to payload module 102. Payload module 102 can also include standard parallel multi-drop bus connection sites (not shown for clarity), which are known in the art. In embodiment, switched fabric enabled mezzanine card connection site 114 can be independent of parallel multi-drop bus connection sites, by being a separate connector. In another embodiment, switched fabric enabled mezzanine card connection site 114 can be integral with a parallel multi-drop bus connection site. The scope of the invention is not limited by these switched fabric enabled mezzanine card connection site embodiments, and other embodiments that occur to those skilled in the art are within the scope of the invention. As an example of an embodiment, switched fabric enabled mezzanine card connection site 114 can be a Tyco MultiGig RT connector manufactured by the AMP division of Tyco Electronics, Harrisburg, Pa. The invention is not limited to the use of the Tyco RT connector, and any connector capable of communicating using a switched fabric protocol is encompassed within the invention.

Figure 2:
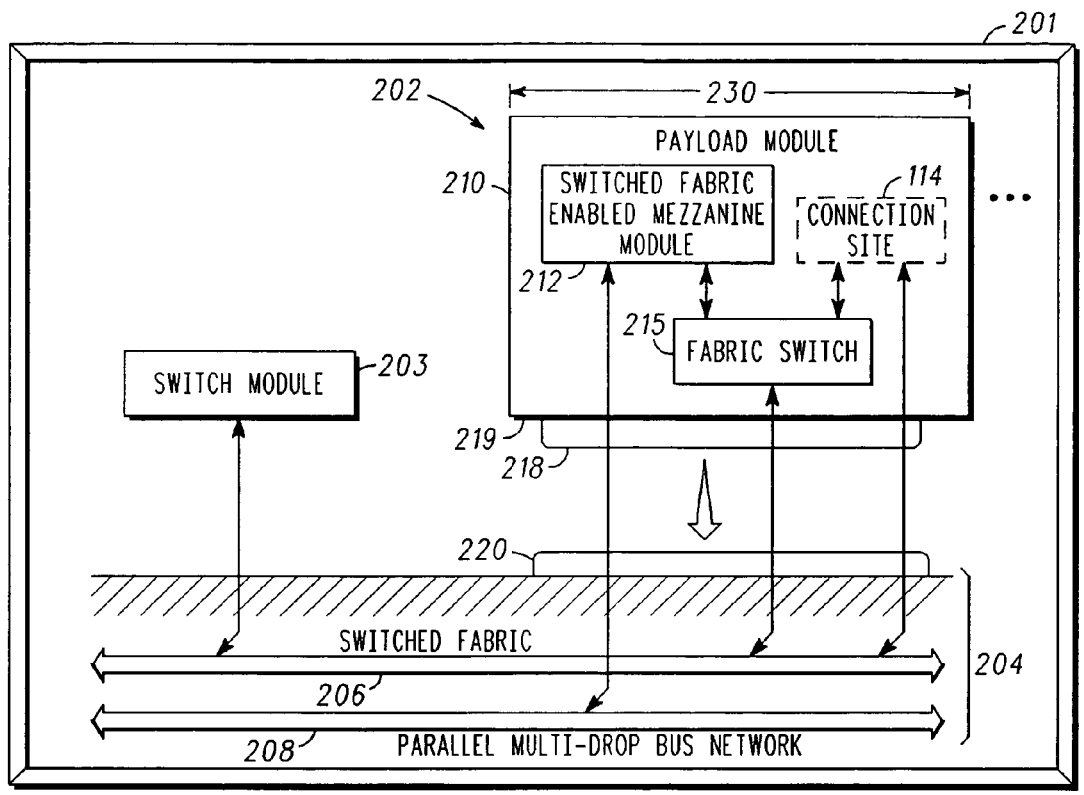
FIG. 2 depicts a multi-service platform system according to another embodiment of the invention.

FIG. 2 depicts a multi-service platform system 200 according to another embodiment of the invention. In the embodiment depicted in FIG. 2, like numbered elements represent elements discussed with reference to FIG. 1. For example, payload module 202 depicted in FIG. 2 is analogous to payload module 102 depicted in FIG. 1.

In the embodiment depicted in FIG. 2, payload module 202 can include fabric switch 215 communicatively interposed between switched fabric enabled mezzanine card 212 and at least one multi-gigabit connector 218. If payload module 202 includes another switched fabric enabled mezzanine card in connection site 214, fabric switch 215 can also be interposed there in a like manner as shown. In an embodiment, fabric switch 215 can act as a router for mezzanine cards on payload module 202. In an embodiment, switched fabric enabled mezzanine card 212 is coupled to directly communicate with switched fabric 206 via fabric switch 215. In other words, switched fabric enabled mezzanine card 212 can directly communicate with switched fabric 206 though fabric switch 215. In an embodiment, fabric switch 215 can control which switched fabric enabled mezzanine card on payload module 202 is coupled to backplane 204, and hence switched fabric 206.

In another embodiment, switched fabric 206 can include a first switch fabric and a second switch fabric. First switch fabric can be controlled by a first switch module and second switch fabric can be controlled by second switch module. In this embodiment, fabric switch 215 can control which switched fabric enabled mezzanine card is coupled to either one of first switched fabric or second switched fabric.

Figure 3:
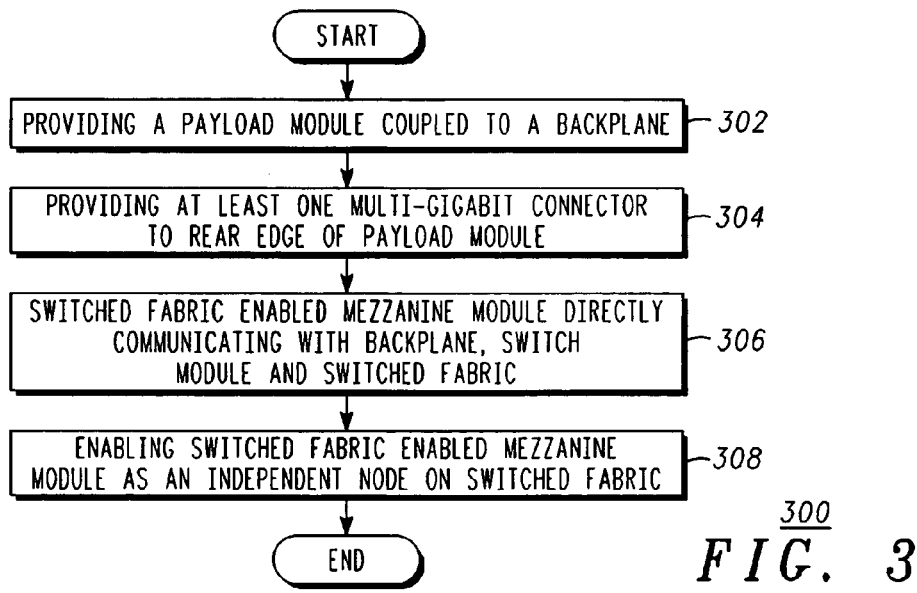
FIG. 3 illustrates a flowchart according to an embodiment of the invention.

FIG. 3 illustrates a flow diagram of a method according to an embodiment of the invention. In step 302, a payload module having one of a 3U, 6U or 9U form factor is coupled to a backplane. In step 304, at least one multi-gigabit connector is coupled to rear edge of payload module, where the at least one multi-gigabit connector is coupled to communicatively interface the payload module to the backplane. The backplane includes a switched fabric coincident with at least one of a VMEbus network and a PCI network, where the switched fabric and at least one of the VMEbus network and the PCI network are communicatively coupled to the payload module through the at least one multi-gigabit connector. In step 306, switched fabric enabled mezzanine card directly communicates with backplane, switch module and switched fabric. In step 308, switched fabric enabled mezzanine card is enabled as an independent node on switched fabric.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. A multi-service platform system, comprising:
a backplane;
a switched fabric on the backplane;
at least one of a VMEbus network and a PCI network coincident with the switched fabric on the backplane;
a payload module having one of a 3U form factor, a 6U form factor and a 9U form factor, wherein the payload module is communicatively coupled with the backplane using the switched fabric and at least one of the VMEbus network and the PCI network;
at least one multi-gigabit connector coupled to a rear edge of the payload module, wherein the at least one multi-gigabit connector is coupled to communicatively interface the payload module to the backplane, and wherein the switched fabric and at least one of the VMEbus network and the PCI network are communicatively coupled with the payload module through the at least one multi-gigabit connector; and
a switched fabric enabled mezzanine card coupled to the payload module, wherein the switched fabric enabled mezzanine card is coupled to directly communicate with the backplane.

2. The multi-service platform system of claim 1, further comprising a switch module coupled to the backplane, wherein the switched fabric enabled mezzanine card is coupled to directly communicate with the switch module.

3. The multi-service platform system of claim 1, further comprising a switch module coupled to the backplane, wherein the switch module directly controls the switched fabric enabled mezzanine card.

4. The multi-service platform system of claim 1, wherein the switched fabric enabled mezzanine card is directly coupled to the backplane though the at least one multi-gigabit connector.

5. The multi-service platform system of claim 1, wherein communication between the backplane and the switch fabric enabled mezzanine card occur exclusively through the at least one multi-gigabit connector.

6. The multi-service platform system of claim 1, wherein at least one multi-gigabit connector spans substantially an entire portion of the rear edge of the payload module.

7. The multi-service platform system of claim 1, wherein the rear edge of the payload module excludes a legacy connector.

8. The multi-service platform system of claim 1, further comprising a switch module coupled to the backplane, wherein the switch module controls the switched fabric and wherein the switched fabric enabled mezzanine card is an independent node on the switched fabric.

9. The multi-service platform system of claim 1, wherein the switched fabric enabled mezzanine card is coupled to directly communicate with the backplane through a fabric switch.

10. A payload module, comprising:
a switched fabric enabled mezzanine card connection site, wherein the payload module has one of a 3U form factor, a 6U form factor and a 9U form factor; and
at least one multi-gigabit connector directly coupled to a rear edge of the payload module and to the switched fabric enabled mezzanine card connection site, wherein the at least one multi-gigabit connector is coupled to communicatively interface the switched fabric enabled mezzanine card connection site to a backplane, wherein the backplane includes a switched fabric coincident with at least one of a VMEbus network and a PCI network, and wherein the switched fabric and at least one of the VMEbus network and the PCI network are communicatively coupled to the switched fabric enabled mezzanine card connection site through the at least one multi-gigabit connector.

11. The payload module of claim 10, wherein the at least one multi-gigabit connector directly coupled to the switched fabric enabled mezzanine card connection site enables a switched fabric enabled mezzanine card coupled to the switched fabric enabled mezzanine card site to directly communicate with the backplane.

12. The payload module of claim 10, wherein the switched fabric enabled mezzanine card connection site directly coupled to the at least one multi-gigabit connector enables the switched fabric enabled mezzanine card to directly communicate with a switch module coupled to the backplane.

13. The payload module of claim 10, wherein the switched fabric enabled mezzanine card connection site directly coupled to the at least one multi-gigabit connector enables a switch module coupled to the backplane to directly control the switched fabric enabled mezzanine card.

14. The payload module of claim 10, wherein the switched fabric enabled mezzanine card connection site directly coupled to the at least one multi-gigabit connector enables the switched fabric enabled mezzanine card as an independent node on the switched fabric.

15. The payload module of claim 10, wherein communication between the backplane and the switch fabric enabled mezzanine card connection site occurs exclusively through the at least one multi-gigabit connector.

16. The payload module of claim 10, wherein at least one multi-gigabit connector spans substantially an entire portion of the rear edge of the payload module.

17. The payload module of claim 10, wherein the rear edge of the payload module excludes a legacy connector.

18. A method, comprising:
providing a payload module coupled to a backplane, wherein the payload module has one of a 3U form factor, a 6U form factor and a 9U form factor;
providing at least one multi-gigabit connector directly coupled to a rear edge of the payload module, wherein the at least one multi-gigabit connector is coupled to communicatively interface the payload module to a backplane, wherein the backplane includes a switched fabric coincident with at least one of a VMEbus network and a PCI network, and wherein the switched fabric and at least one of the VMEbus network and the PCI network are communicatively coupled to the payload module through the at least one multi-gigabit connector;

coupling a switched fabric enabled mezzanine card to the payload module; and the switched fabric enabled mezzanine card directly communicating with the backplane.

19. The method of claim 18, further comprising the switched fabric enabled mezzanine card directly communicating with a switch module coupled to the backplane.

20. The method of claim 18, further comprising a switch module coupled to the backplane directly controlling the switched fabric enabled mezzanine card.

21. The method of claim 18, wherein coupling the switched fabric enabled mezzanine card to the payload module comprises coupling the switched fabric enabled mezzanine card to a switched fabric enabled mezzanine card connection site on the payload module.

22. The method of claim 21, wherein directly communicating the switched fabric enabled mezzanine card directly communicating with the backplane through the switched fabric enabled mezzanine card site and the at least one multi-gigabit connector.

23. The method of claim 18, wherein directly communicating with the backplane comprises enabling the switched fabric enabled mezzanine card as an independent node on the switched fabric.

* * * * *